United States Patent [19]
Amick et al.

[11] Patent Number: 5,381,506
[45] Date of Patent: Jan. 10, 1995

[54] FLAT TO SPIRAL POLYMER LIGHT WAVEGUIDE

[75] Inventors: Patricia J. Amick, Bridgeton; Loyd Perrymore, St. Louis; Michael D. Auld, Ballwin, all of Mo.

[73] Assignee: McDonnell Douglas Corporation, St. Louis, Mo.

[21] Appl. No.: 136,920

[22] Filed: Oct. 18, 1993

[51] Int. Cl.⁶ ............................. G02B 6/00; G02B 6/16
[52] U.S. Cl. ..................................... 385/129; 385/114
[58] Field of Search ................ 385/114, 120, 129, 130

[56] References Cited

U.S. PATENT DOCUMENTS 4,496,215 1/1985 Shaheen et al. ................... 385/114
5,042,892 8/1991 Chiu et al. ......................... 385/114
5,259,050 11/1993 Yamakawa et al. ............ 385/114 X

*Primary Examiner*—Akm E. Ullah
*Attorney, Agent, or Firm*—Pillsbury Madison & Sutro

[57] ABSTRACT

An L-shaped normally flat polymeric waveguide laminate is used to connect between an inline array of optical devices, a plurality of optical fibers or the like and a circular connector, such as typically used to feed pluralities of optical transmission lines through a bulkhead or other location where the optical transmission lines must be disconnectible, by having the waveguides make a right angle bend in the L-shaped laminate which can then be rolled into a spiral and connected to circular optical feed-throughs typically used as bulkhead or other type optical connectors with fixed pin spacing.

20 Claims, 3 Drawing Sheets

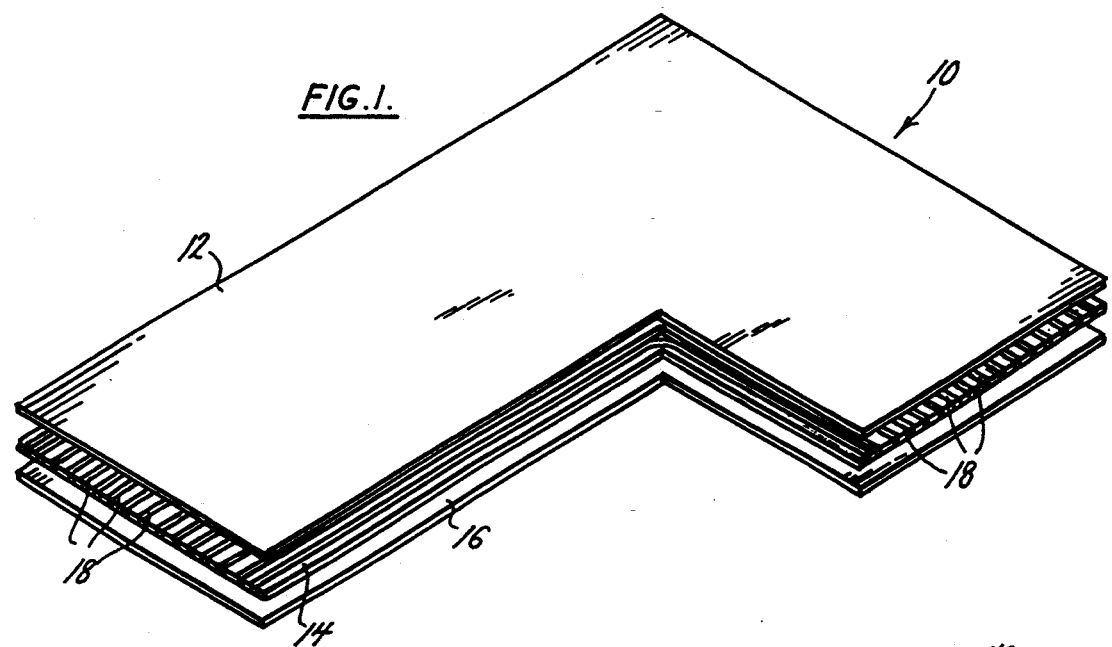
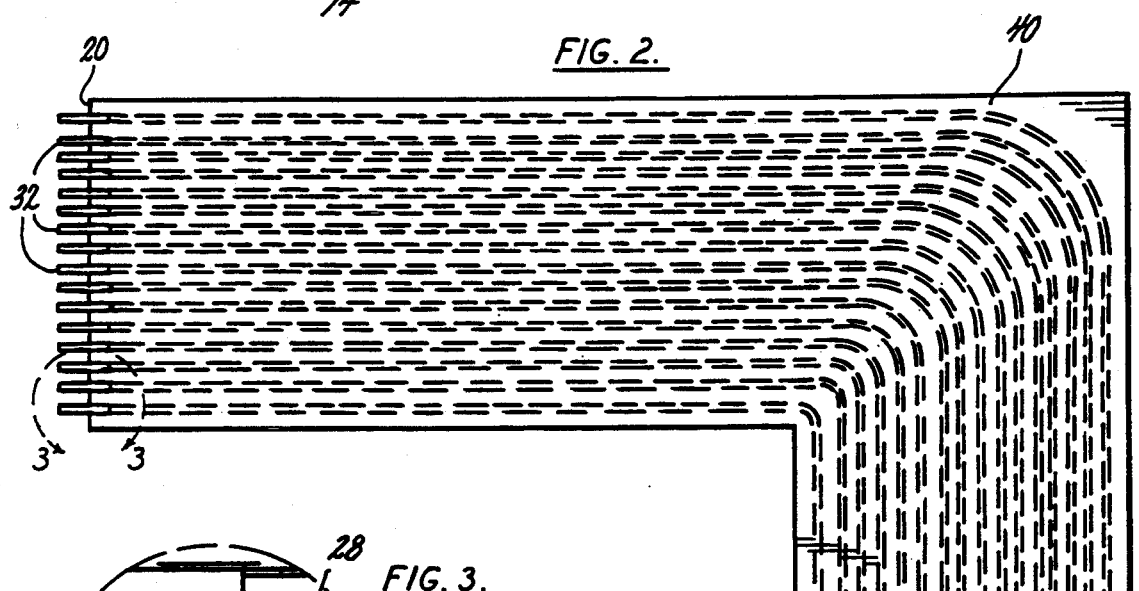
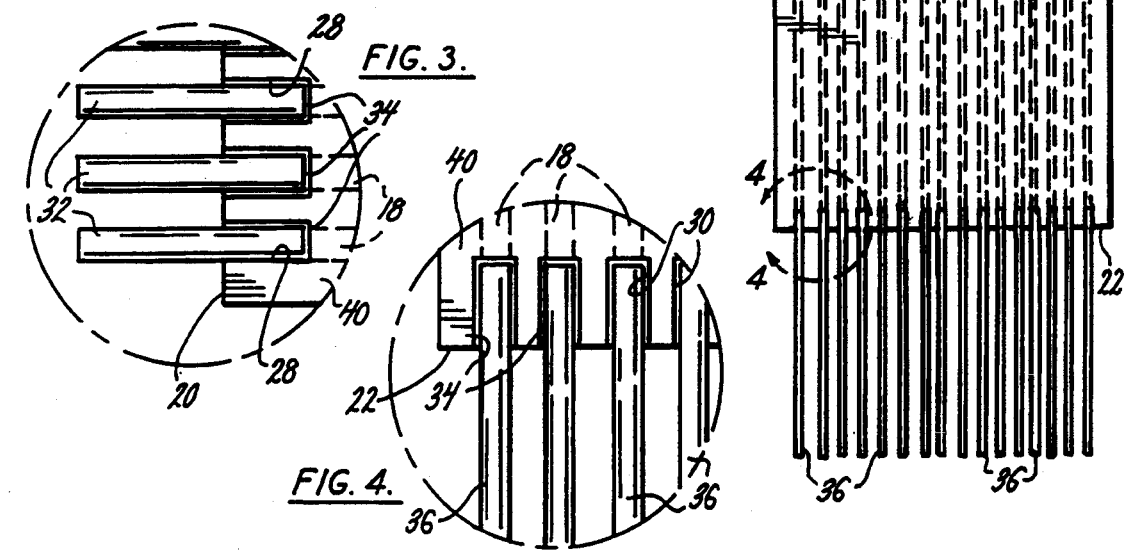

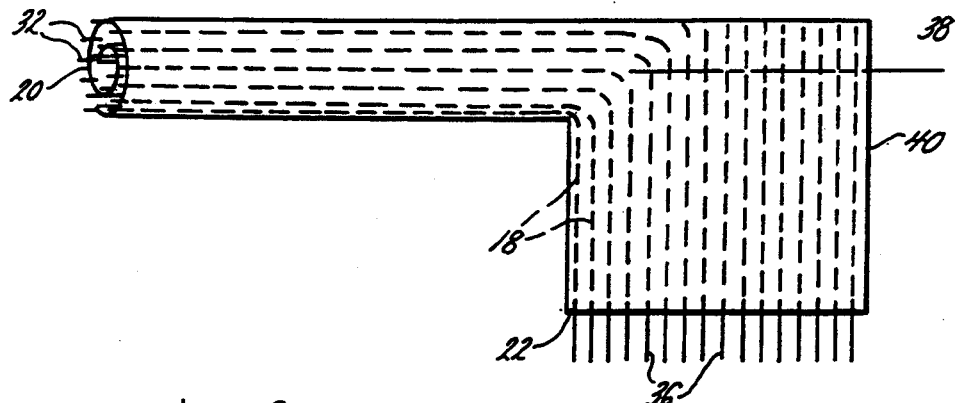
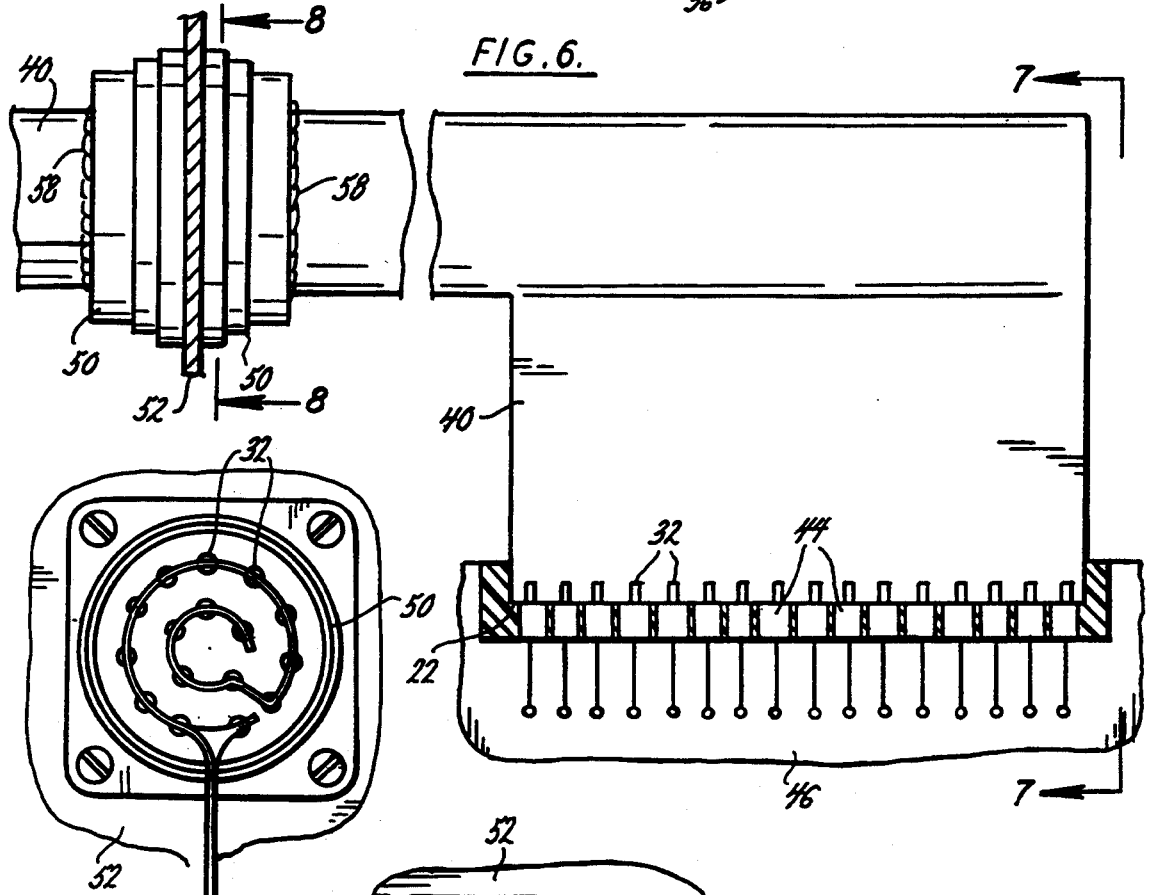
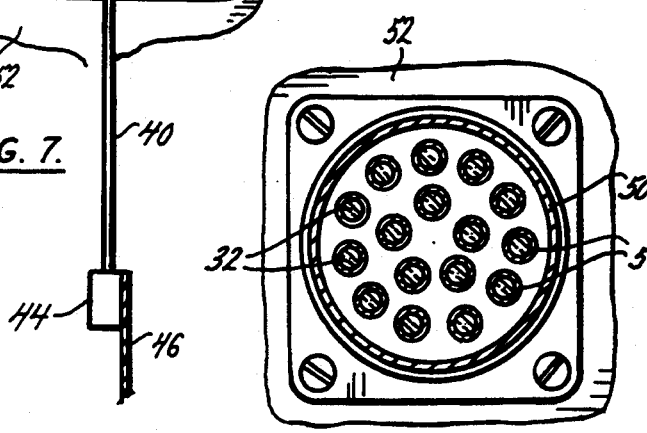

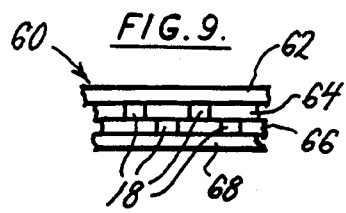 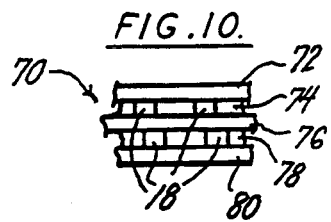 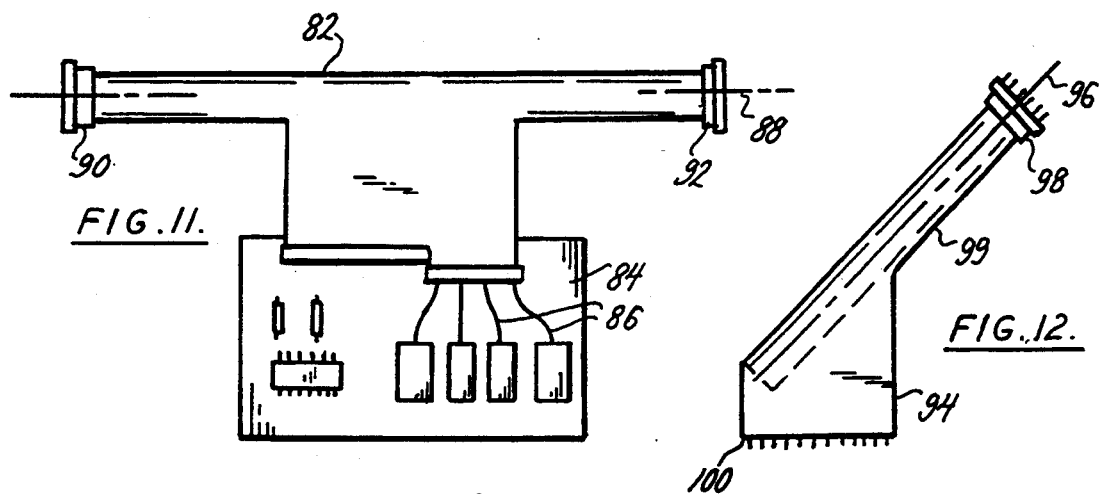 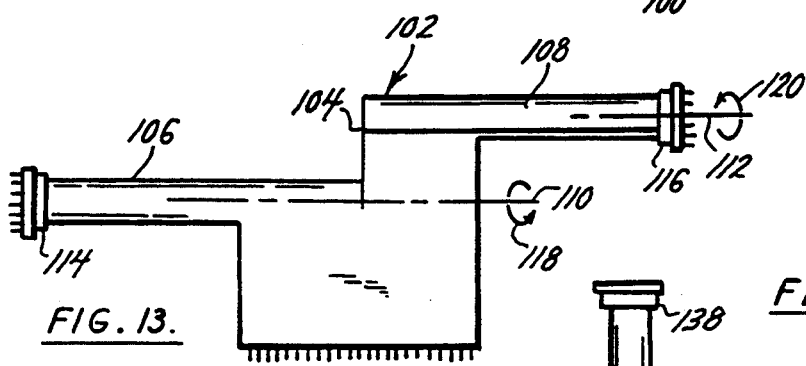 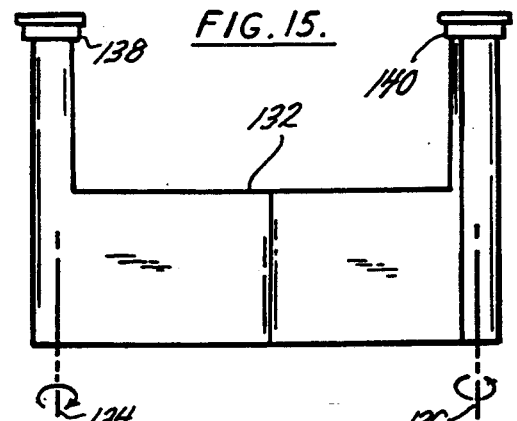 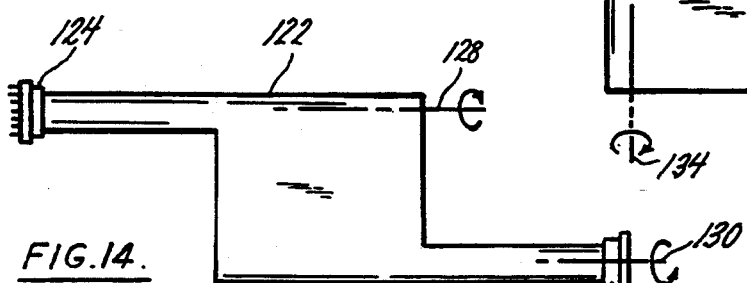 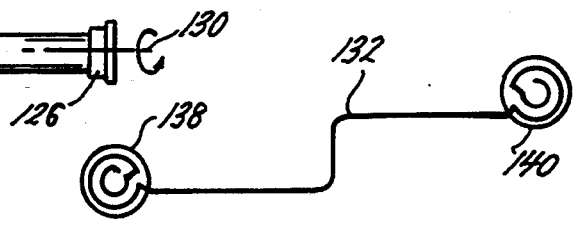

FLAT TO SPIRAL POLYMER LIGHT WAVEGUIDE

TECHNICAL FIELD OF THE INVENTION

The present invention relates to optical interconnections especially those used within aircraft.

BACKGROUND OF THE INVENTION

The interconnections between the various components of electronic systems must be made reliably with negligible loss of signal. This is especially true in aircraft whether it be a military or a commercial aircraft. The various interconnections include interconnections within a component, component to printed wiring substrate, assembly to heat-sink, module to motherboard, motherboard to backplane, backplane to system box, and box to box interconnection. Of these interconnections, the box to box interconnection is the key to high speed data transfer.

Communication links are now being provided that operate in the optical regime because such has greater band widths than are available in the RF or electrical regime and therefore can carry much more data along a single link. Commercial telecommunications companies are quickly installing such optical links for high data rate transmission and because of such use, components to carry optical signals and to convert electrical signals to and from the optical regime have become relatively economical, well-defined and easy to use.

In the aircraft industry, optical communication links are highly desirable since information can be carried in optical cables that are much smaller and lighter than the metallic electrical cables currently used in aircraft and problems, such as electrical cross-talk caused by close conductor spacing and vulnerability to electromagnetic fields, are eliminated. However, as with any conversion of new technology to the additional use in existing aircraft or to correspond to common aircraft design, there has been a need to provide optical connections at various locations throughout the aircraft so that the optical channels can be fed between electronic boxes, through bulkheads and other locations required in the aircraft structure. Commonly, glass fibers, used as the light transmission means (optical waveguide) are formed into a cable bundle. Heretofore, each fiber must have been individually broken out and connected to optical devices or optical connectors. Traditionally, most electronic devices are mounted onto planar printed circuit boards, whereas for size and mechanical efficiency it is desired to provide optical fibers in a generally circular cross-section cable.

Since it is time-consuming and labor intensive to make the optical connections within circular bulkhead style connectors commonly used throughout aircraft wiring systems, there has been a need to provide means to easily optically connect planar optical waveguide arrays or fibers to optical bulkhead feed-throughs, which are rugged, lightweight and relatively economical to manufacture.

BRIEF DESCRIPTION OF THE PRESENT INVENTION

Flat polymeric laminates are sandwiched together to provide a flat flexible optical cable with multiple optical waveguide structures. The polymeric waveguide laminate consists of a multilayer laminate of 3 or more layers in which the top and bottom layers are polymeric dielectric and the even middle layers are dielectric with multiple parallel waveguide structures defined therein, such as by photolithography with UV light. The waveguides are formed with an approximate right angle bend so that an L-shaped structure results. One end of the L-shaped structure remains flat and can be connected to a linear component array within an electronic systems box or to optical fibers on a planar circuit board. Once the plurality of waveguides structures in the polymer sheet composite have made a near 90° bend, they can be formed into a spiral structure so that the opposite end of the "L" can be matched with the generally spirally arranged optical connector pins of optical feed-through connectors, such as are available as standard circular connectors, such as MIL-C-38999 or equivalents. The complete connection between the linear array and such standard circular connector includes the L-shaped flat polymeric waveguide laminate material, male or female fiber optic termini, optical fiber stubs and optical index matching fiber bonding material.

The waveguide structures for the present connector must make L-shaped bends within the middle layers and have identical spacing to the connectors pin spacing if the expected labor saving is to be realized. At the module end of the polymeric waveguide laminate, the waveguides are ablated and either fiber stubs are attached for connection to the electronic planar module or optical fibers are directly inserted therein. At the connector housing end the waveguides are ablated and optical fiber stubs are attached. Preferably, index matching fiber bonding material is used to secure the fibers and to assure minimum signal loss. The laminate is then spiral rolled around a horizontal axis to match the connector contact pattern and then assembled into the connector housing by inserting the opposite ends of the optical fiber stubs into the connector pins of the connector, thereby creating a connection between a linear array and a circular connector.

Therefore, it is the object of the present invention to provide an optical connection between a plurality of optical waveguides from a linear array and a generally spiral one.

Another object is to reduce the cost of installing optical communication paths within aircraft.

Another object is to provide light weight, efficient, optical connections within a weight and volume restricted environment.

Another object is to reduce the labor required to provide an optical communications system.

These and other objects and advantages of the present invention will become apparent to those skilled in the art after considering the following details specification together with the accompanying drawings wherein.

BRIEF DESCRIPTION OF THE DRAWINGS

FIG. 1 is an exploded view of an L-shaped polymer waveguide constructed according to the present invention;

FIG. 2 is a plan view of the assembled polymer laminate of FIG. 1 showing the individual optical waveguides therethrough with optical fibers installed in the ends thereof;

FIG. 3 is an enlarged view taken at area 3—3 of FIG. 2;

FIG. 4 is an enlarged view taken at area 4—4 of FIG. 2;

FIG. 5 is a view of the waveguide laminate of FIG. 2 formed for connection to a linear array on one end and the spiral optical feed-through pins of a circular connector on the other;

FIG. 6 is a plan view of the multiple waveguide optical laminate of FIG. 3 with a linear array connected on one end and a circular connector on the other;

FIG. 7 is an end view taken on line 7—7 of FIG. 6;

FIG. 8 is a cross-sectional view take at line 8—8 of FIG. 6;

FIG. 9 is an enlarged cross-sectional view of four layer polymer waveguide having adjacent waveguide containing layers with the waveguides being staggered;

FIG. 10 is an enlarged cross-sectional view of five layer polymer waveguide having adjacent waveguide containing layers;

FIG. 11 is plan view of a T shaped waveguide laminate formed for connection to a linear array and with individual optical fibers on one end and the spiral optical feed-through pins of circular connectors on the other ends;

FIG. 12 is plan view of a waveguide laminate formed with less than a right angle therein;

FIG. 13 is plan view of a T shaped waveguide laminate the circular connectors offset;

FIG. 14 is plan view of a waveguide laminate connecting two offset circular connectors;

FIG. 15 is plan view of a U shaped waveguide laminate connecting two vertically offset circular connectors; and FIG. 16 is end view of the U shaped waveguide laminate of FIG. 15.

DETAILED DESCRIPTION OF THE SHOWN EMBODIMENTS

Referring to the drawings more particularly by reference numbers number 10 in FIG. 1 refers to a stack of an odd number of L-shaped flat polymeric layers, three being shown as layers 12, 14 and 16. The top and bottom layers, 12 and 16, are uniform polymeric dielectric having a constant index of optical refraction, whereas the middle layer 14 has multiple L-shaped parallel waveguide structures of a higher index of refraction formed therein such as by photolithography with ultraviolet light. When the layers 12 14 and 16 are sandwiched together as shown in FIG. 2, the waveguide structures 18 are fully formed and able to transmit light without substantial loss between the ends 20 and 22 thereof.

As shown in FIGS. 3 and 4, the ends 24 and 26 are cut back from the ends 20 and 22 such as by laser ablation to form connecting sockets 28 and 30 in the ends 20 and 22. Optical fiber stubs 32 are placed in the sockets 28 and retained therein by suitable index matching adhesive 34 used to assure that light can transmit between the stubs 32 and the waveguide structures 18 with minimal loss. The index matching adhesive 34 is also used to connect optical fibers 36 into the sockets 30 the fibers 36 being shown in FIG. 2 extending for connection to components not shown although stubs to connectors can also be used. Thereafter one end and 20 being shown is rolled about a horizontal axis 38 as shown in FIG. 5 so that the stubs 32 are generally formed extending in a spiral pattern to form the present polymer photonic connection 40. As shown in FIG. 6 the connection 40 also can have the end 22 thereof connected into a linear array of connector pins or light transmitters or receivers 44 they being shown mounted on a planer circuit board 46. The end 20 is useful for connection such as the standard bulkhead connector 50 shown providing a pathway through a bulkhead 52 such as is typical in aircraft structure. Such connectors 50 have a plurality of pins 54 a predetermined distance apart in a circular or generally spiral pattern so that when the waveguide structures 18 are properly located on the layer 14, the stubs 32 can be permanently secured to the pins 54 easily and quickly in a production environment, thereby creating a economical and easy to manufacture conversion connection between a generally spiral array of connector pins and an array which may be linear or curved. The end 20 may be secured into the connector 50 by potting compound 58 or other suitable means.

A modified polymeric waveguide 60 is shown in FIG. 9 having four layers 62, 64, 66 and 68 sandwiched together. Inner layers 64 and 66 contain waveguide structures 18 at staggered locations to provide separation for any light traveling therewithin.

The polymeric waveguide 70 shown in FIG. 10 includes layers 72, 74, 76, 78 and 80 stacked together with waveguide structures 18 being formed in layers 74 and 78 between non-waveguide structure containing layers 72, 76 and 80 so that the waveguide structures 18 can run in the same vertical location or cross over each other.

In FIG. 11, a T-shaped polymeric waveguide 82 is shown connecting the optical outputs and inputs of a printed circuit board 84 both directly into the polymeric waveguide 82 and through the use of individual optical fibers 86. After its waveguide structures 18 have made an approximately 90-degree bend parallel to axis 88, the polymeric waveguide 82 is rolled about the axis 88 and terminated with circular connectors 90 and 92. Although in most instances the waveguide structures 18 require a near 90-degree bend so the polymeric waveguides can be rolled, in FIG. 12 a polymeric waveguide 94 is shown wherein the waveguide structures 18 make substantially less than a 90-degree bend. Rolling about the axis 96 for connection to connector 98 is still possible since the rolled area 99 does not extend to the linear end 100 thereof.

FIGS. 13 through 16 show other possible configurations of polymeric waveguide. The polymeric waveguide 102 of FIG. 13 is generally similar to the waveguide 82 except that it is bifurcated at a split 104 so that portions 106 and 108 thereof may be rolled about different axes 110 and 112 for connection into circular connectors 114 and 116 respectively. Note that the roll direction indicated by arrows 118 and 120 is opposite so that the same type of connector 114 or 116 can be used on the waveguide 102. The polymeric waveguide 122 of FIG. 14 is for connection to connectors 124 and 126 which are shown to have parallel axes 128 and 130 offset from each other. The U-shaped polymeric waveguide 132 illustrates that the present invention can be used to connect between connectors facing outwardly in the same direction even though they may be offset as can be seen in FIG. 16. The U-shaped polymeric waveguide 132 is rolled about axes 134 and 136 in opposite directions so that connector 138 can be the opposite side connector from connector 140.

Thus there has been shown and described a novel optical connection which fulfills all of the objects and advantages sought therefor. Many changes, alterations, modifications and other uses and applications of the subject connection will become apparent to those skilled in the art after considering this specification together with the accompanying drawings. All such changes, alterations and modifications that do not depart from the spirit and scope of the invention are deemed to be covered by the invention, which is limited only by the claims which follow:

What is claimed is:

1. An optical connection for connecting a generally spiral array of optical connector pins to an array of optical means of another configuration including:
at least three stacked polymer layers having:
first and second ends; and
at least one bulk predetermined optical index of refraction, at least one inner layer thereof having:
a plurality of lines of a different index of refraction forming optical waveguides formed in said at least one inner layer, each of said lines having:
at least one bend therein in the plane of said stacked layers, said first end of said stacked layers being rolled into a spiral for connection to a spiral array of optical connector pins.

2. The optical connection as defined in claim 1 wherein said first end includes:
sockets at the ends of each line thereat; and
an optical fiber stub attached in each of said sockets for connection to the optical connector pins.

3. The optical connection as defined in claim 2 wherein said second end includes:
sockets at the ends of each line thereat; and
an optical fiber attached in each of said sockets.

4. The optical connection as defined in claim 3 wherein said second end is generally planar.

5. The optical connection as defined in claim 3 wherein said lines are generally parallel to each other.

6. The optical connection as defined in claim 5 wherein said at least one inner layer includes:
at least two inner layers containing said lines, said lines of said at least two inner layers being staggered for connection to the optical connector pins.

7. An optical connection for connecting a plurality of generally planar optical paths through aircraft bulkheads including:
a first generally circular bulkhead connector having:
a plurality of spaced optical pins extending therefrom;
at least three stacked polymer layers comprising two outer layers and at least one inner layer, said layers having:
first and second ends; and
at least one bulk predetermined optical index of refraction, said at least one inner layer having:
a first plurality of lines of a different index of refraction chosen to form optical waveguides when said layers are laminated together, each of said first plurality of lines extending between said first and second ends and having:
at least one bend therein in the plane of said at least one inner layer, said first end of said stacked layers being rolled about an axis extending outwardly from said first end and said first plurality of lines being connected to said optical connector pins at said first end.

8. The optical connection as defined in claim 7 wherein said optical connector pins are parallel to each other and formed into a generally spiral array.

9. The optical connection as defined in claim 7 wherein said first end includes:
a socket at the end of each line of said first plurality of lines; and
optical fiber stubs, each stub being adhesively attached in one of said sockets and to one of said optical connector pins.

10. The optical connection as defined in claim 9 wherein said second end includes:
a socket at the end of each line of said first plurality of lines; and
optical fibers, each fiber being attached in one of said sockets.

11. The optical connection as defined in claim 9 wherein said second end is generally planar and said at least one bend in each of said lines of said first plurality of lines being generally a right angle bend.

12. A method of constructing an optical connection for connecting a generally spiral array of optical connector pins to an array of optical means of another configuration including the steps of:
exposing lines in a first layer of polymer to radiation to change the optical index of refraction thereof, the lines having:
at least one bend therein; and
first and second ends;
sandwiching the first polymer layer between a second and third polymer layer having an index of refraction different from the lines so that optical waveguides are formed by the lines;
rolling the sandwiched layers so that the first ends of the lines are rolled about an axis; and
connecting the first ends of the lines to the generally spiral array of optical connector pins.

13. The method of constructing an optical connection as defined in claim 12 including the additional step of:
forming a socket adjacent the first end of each line.

14. The method of constructing an optical connection as defined in claim 12 including the additional step of:
abrading a socket adjacent the first end of each line with a laser beam.

15. The method of constructing an optical connection as defined in claim 12 including the additional steps of:
forming a socket adjacent the first end of each line; and
adhesively attaching an optical fiber stub in each socket that extends outwardly from the layers.

16. The method of constructing an optical connection as defined in claim 12 including the additional steps of:
forming a socket adjacent the second end of each line; and
adhesively attaching an optical fiber in each socket that extends outwardly from the layers for attachment to a generally linear array.

17. The method of constructing an optical connection as defined in claim 12 wherein the step of exposing lines further includes:
exposing the lines generally parallel to each other and so the bends therein are generally right angle bends.

18. The method of constructing an optical connection as defined in claim 12 including the additional steps of:
forming a socket adjacent the first end of each line;
adhesively attaching an optical fiber stub in each socket that extends outwardly from the layers;
forming a socket adjacent the second end of each line; and
adhesively attaching an optical fiber in each socket that extends outwardly from the layers for attachment to a generally linear array.

19. The method of constructing an optical connection as defined in claim 18 wherein the step of exposing lines includes exposing the lines a spaced distance at least as large as the spacing between adjacent optical connector pins.

20. An optical connection for connecting a plurality of generally planar optical paths through aircraft bulkheads including:
    a first generally circular bulkhead connector having:
        a plurality of spaced optical pins extending therefrom;
    at least three stacked polymer layers comprising two outer layers and at least one inner layer, said layers having:
        first and second ends; and
        at least one bulk predetermined optical index of refraction, said at least one inner layer having:
        a first plurality of lines of a different index of refraction chosen to form optical waveguides when said layers are connected together, each of said first plurality of lines extending between said first and second ends and having:
        at least one bend therein in the plane of said inner layer, said first end of said stacked layers being rolled about an axis extending outwardly form said first end and said first plurality of lines being connected to said optical connector pins at said first end, wherein said first end includes:
        a socket at the end of each line of said first plurality of lines; and
        optical fiber stubs, each stub being adhesively attached in one of said sockets and to one of said optical connector pins; and
    a second generally circular bulkhead connector having:
        a plurality of spaced optical pins extending therefrom, and wherein said layers have:
        a third end, and wherein said at least one inner layer has:
        a second plurality of lines of a different index of refraction chosen to form optical waveguides when said layers are connected together, each of said second plurality of lines extending between said second and third ends and having:
        at least one bend therein in the plane of said inner layer, said third end of said stacked layers being rolled about an axis extending outwardly from said third end and said second plurality of lines being connected to said optical connector pins of said second generally circular bulkhead connector at said third end.

* * * * *